(12) United States Patent
Pal

(10) Patent No.: US 12,131,173 B2
(45) Date of Patent: Oct. 29, 2024

(54) CONTAINERS ON DEMAND

(71) Applicant: Red Hat, Inc., Raleigh, NC (US)

(72) Inventor: Dmitri Pal, Chelmsford, MA (US)

(73) Assignee: Red Hat, Inc., Raleigh, NC (US)

( * ) Notice: Subject to any disclaimer, the term of this patent is extended or adjusted under 35 U.S.C. 154(b) by 192 days.

(21) Appl. No.: 17/166,902

(22) Filed: Feb. 3, 2021

(65) Prior Publication Data

US 2022/0244976 A1 Aug. 4, 2022

(51) Int. Cl.
*G06F 15/177* (2006.01)
*G06F 9/455* (2018.01)
*H04L 67/141* (2022.01)

(52) U.S. Cl.
CPC ........ *G06F 9/45533* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 10,002,247 B2 | 6/2018 | Suarez et al. | |
| 10,719,369 B1 * | 7/2020 | Aithal | H04L 63/0263 |
| 10,725,775 B2 | 7/2020 | Suarez et al. | |
| 10,747,650 B2 | 8/2020 | Alexander et al. | |
| 2016/0072727 A1 * | 3/2016 | Leafe | H04L 47/781 |
| | | | 709/226 |
| 2017/0180346 A1 * | 6/2017 | Suarez | G06F 21/53 |
| 2018/0048716 A1 * | 2/2018 | Madhayyan | G06F 9/45558 |
| 2020/0349059 A1 * | 11/2020 | Alexander | G06F 9/45558 |
| 2021/0103395 A1 * | 4/2021 | Yankovskiy | G06F 3/0604 |
| 2021/0240671 A1 * | 8/2021 | Fong | H04L 67/06 |
| 2021/0311763 A1 * | 10/2021 | Beard | G06F 8/65 |
| 2021/0311764 A1 * | 10/2021 | Rosoff | G06F 9/5077 |

FOREIGN PATENT DOCUMENTS

CN 112187532 A * 1/2021

OTHER PUBLICATIONS

Jamon Camisso, Hanif Jetha, & Katherine Juell, "Kubernetes for Full-Stack Developers," DigitalOcean, Jan. 2020, New York City, NY, USA, https://assets.digitalocean.com/books/kubernetes-for-full-stack-developers.pdf.
Brandon Chavis & Thomas Jones, "Docker on AWS Running-Containers in the Cloud," Solutions Architect, Apr. 2015, https://d0.awsstatic.com/whitepapers/docker-on-aws.pdf.
Filipe Manco et al., "My VM is Lighter (and Safer) than your Container," NEC Laboratories Europe; Univ. Politehnica of Bucharest, Oct. 28, 2017, Shanghai, China, http://cnp.neclab.eu/projects/lightvm/lightvm.pdf.
"Quickstart: Build and Run a Container image using Azure Container Registry Tasks," Microsoft, Sep. 25, 2020, https://docs.microsoft.com/en-us/azure/container-registry/container-registry-quickstart-task-cli.

* cited by examiner

*Primary Examiner* — Yves Dalencourt
(74) *Attorney, Agent, or Firm* — Womble Bond Dickinson (US) LLP

(57) ABSTRACT

A method includes receiving, from a client device, a request to initiate an action on a target system. The method further includes determining, in view of a container registry, that the action is permissive. The method further includes receiving an authorized container corresponding to the action. The method further includes performing, by a processing device, the action in view of the container.

20 Claims, 6 Drawing Sheets

CONTAINERS ON DEMAND

TECHNICAL FIELD

Aspects of the present disclosure relate to containers on demand, and more specifically, to allowing a virtual machine to maximize efficiency and fetch utilities and tools on demand.

BACKGROUND

In computing, a server is a piece of computer hardware or software (computer program) that provides functionality for other programs or devices, called "clients." This architecture is called the client-server model. Servers can provide various functionalities, often called "services," such as sharing data or resources among multiple clients, or performing computation for a client. A single server can serve multiple clients, and a single client can use multiple servers. A client process may run on the same device or may connect over a network to a server on a different device.

A virtual machine (VM) is the virtualization/emulation of a computer system, and may be run on a server. Virtual machines are based on computer architectures and provide functionality of a physical computer. VM implementations may involve specialized hardware, software, or a combination of the two.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
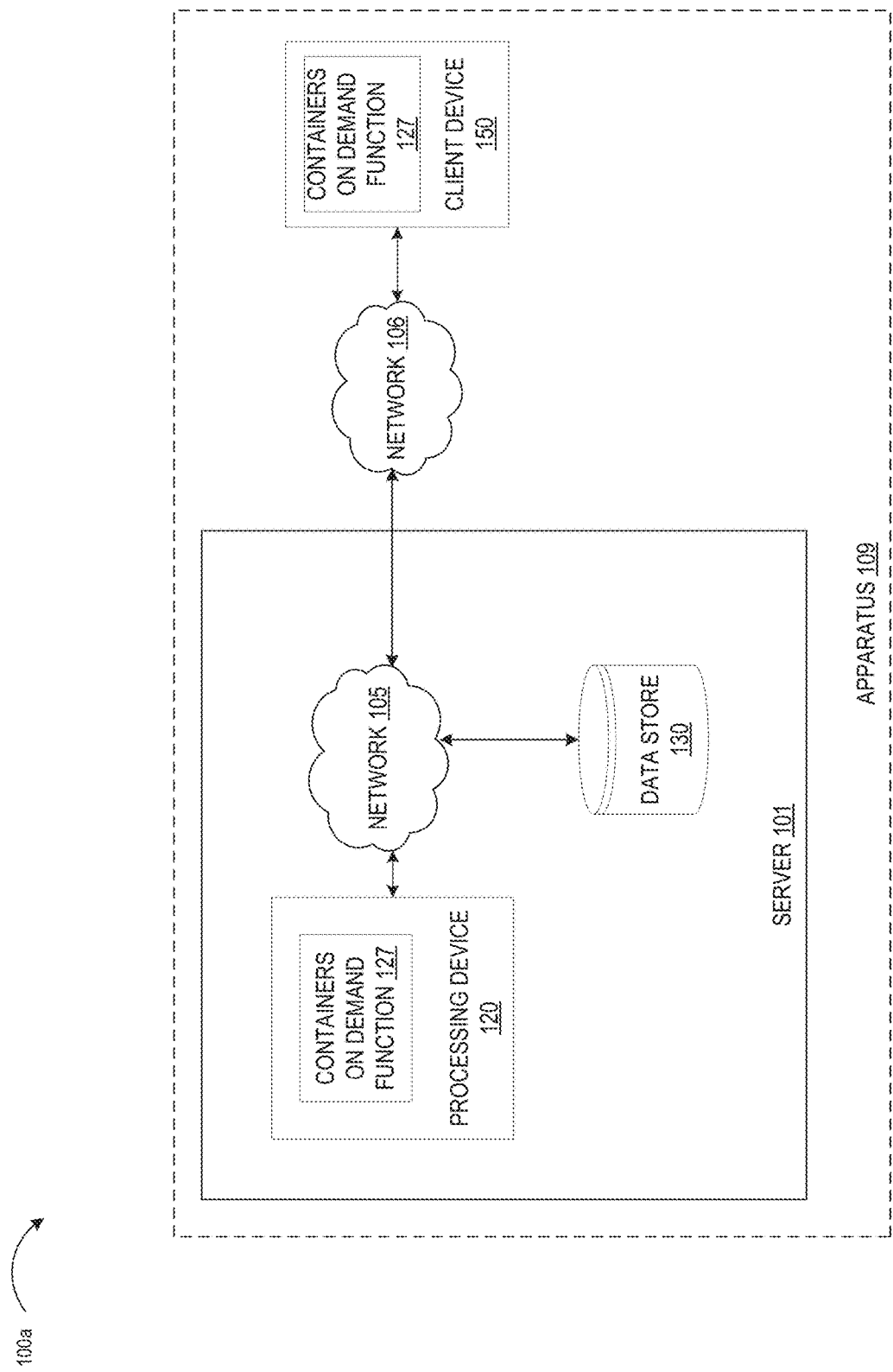
FIG. 1A is a block diagram that illustrates a first example system, in accordance with some embodiments of the present disclosure.

In one embodiment, containers on demand and more specifically, allowing a server running as a virtual machine or bare metal system to maximize efficiency and fetch utilities and tools on demand, are described herein.

Many customers use golden images for their production environments. In one embodiment, a golden image is a pre-configured image template. A golden image may also be referred to as a clone image, master image, or base image. Such golden images may contain only packages that are approved for use by a system authority. In one embodiment, an objective of a golden image may be to minimize the image size of the corresponding system.

Minimizing the image by using a golden image aims to accomplish several goals. For example, in one embodiment, using a golden image may result in the use of only approved content from a security and compliance perspective. In another embodiment, the smaller the image the lower the cost of running the image, especially in cloud environments (e.g., cost of running, cost of building, cost of starting, cost of copying). In another embodiment, the smaller the image the smaller the attack surface from the security perspective. Furthermore, the smaller the image the easier it is to identify the target of certification and conduct required verification.

Different workloads may use the base images (e.g., golden images) as a foundation and add only a minimal set of necessary packages on top. In some contexts, customers may also strive to have immutable images. Immutable images allow the created images to stay intact in production and prevent the workloads from being tainted with content that is either unnecessary or harmful.

A variety of problems exist with using golden images and/or immutable images. For example, in some cases there exists a need to perform an operation on a target system that, due to minimization, does not currently have any functionality installed that may perform the operation. Examples of such operations include, but not limited to: Viewing, analyzing, managing, etc. system configuration (e.g., via Red Hat's Cockpit); Logging into the system (e.g., using Secure Shell (SSH), as a part of user operation or automated system configuration); Collecting system metrics (e.g., using Port Control Protocol (pcp)); Running a troubleshooting tool that may be application/workload specific; etc.

A typical user flow that illustrates a problem with the above approaches, and corresponding needs, is as follows: An administrator may need to log into a target system do some diagnostics and troubleshooting. The administrator also wants their systems to be as slim as possible because they are, for example, running in the cloud, and the bigger the size of images the more it will eventually cost the administrator's organization over time. Also problematically, bigger images also have increased security and compliance implications. In these situations, the administrator would like the necessary tools (e.g., Cockpit, SSH, pcp, etc.) to be installed on demand in response to a specific event or need, similar to just-in-time provisioning. The administrator also may not want to preinstall such tools or keep them installed after the work is done, to maximize efficiency and minimize cost and security risks. After the work is done, the system should be as clean as possible, i.e. it should revert to its original state. The administrator may also not want any special-purpose machinery running continuously.

In response to the problems and needs described above, and others, containers on demand are described. More specifically, the embodiments of the present disclosure overcome the above, and other, challenges by allowing for lean, efficient images to be run the majority of the time, only initializing and executing specialized tools on demand. Once the demand is over, the system may revert to its prior, more efficient state, since temporarily added functionality was completely isolated from the core functionality of the server though the container technology. Advantageously, such a solution to the above problems increases computer system efficiency and decreases security risks, by only installing, executing, and removing infrequently-used packages on demand.

FIG. 1A is a block diagram that illustrates a first example system 100a, in accordance with some embodiments of the present disclosure. As discussed herein, containers on demand function 127 may include logic that enables the operations and systems described herein, when executed. In one embodiment, system 100a may be described as an apparatus 109, including means for performing the operations described herein (e.g., server 101, network 106, client device 150, etc.). In one embodiment, containers on demand function 127 resides or operates in whole or in part on a server (e.g., server 101) of system 100a. In another embodiment, containers on demand function 127 resides in whole or in part on a client device (e.g., client device 150) of system 100a. In yet another embodiment, containers on demand function 127 resides in whole or in part on any combination of the two, or in a different system entirely.

Server 101 may include various components, which may allow containers on demand function 127 to run on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes containers on demand function 127, a computing processing device 120, a data store 130, and a network 105. The containers on demand function 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include containers on demand function 127, in addition to, or alternatively from, server 101. In various embodiments, client device 150 may act as a server by itself, in this case it can also be the barrier of the containers on demand function as defined for a server in the current nomination. Further implementation details of the operations performed by system 101 are described with respect to FIGS. 1B-4.

Figure 1B:
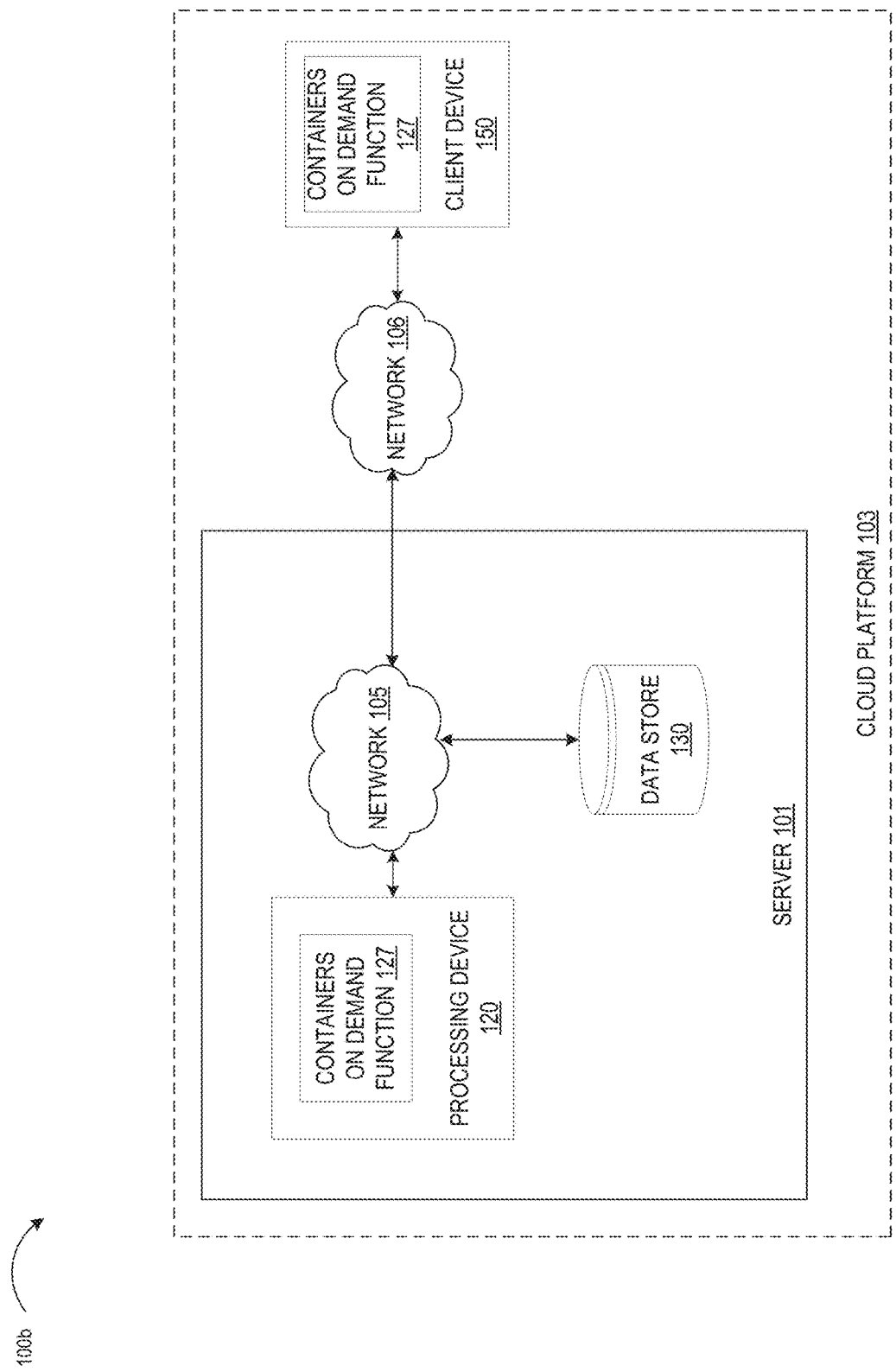
FIG. 1B is a block diagram that illustrates a second example system, in accordance with some embodiments of the present disclosure.

FIG. 1B is a block diagram that illustrates a second example system 100b, in accordance with some embodiments of the present disclosure. System 100b includes a cloud platform 103, which may include one or more components. As discussed herein, containers on demand function 127 may include logic that enables the operations and systems described herein, when executed. In one embodiment, system 100b may be described as a cloud platform 103, including means for performing the operations described herein (e.g., server 101, network 106, client device 150, etc.). In one embodiment, containers on demand function 127 resides in whole or in part on a server (e.g., server 101) of system 100b. In another embodiment, containers on demand function 127 resides in whole or in part on a client device (e.g., client device 150) of system 100b. In yet another embodiment, containers on demand function 127 resides in whole or in part on any combination of the two, or in a different system entirely.

Server 101 may include various components, which may allow containers on demand function 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, server 101 includes containers on demand function 127, a computing processing device 120, a data store 130, and a network 105. The containers on demand function 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include containers on demand function 127, in addition to, or alternatively from, server 101. In various embodiments, client device 150 may act as a server by itself, in this case it can also be the barrier of the containers on demand function as defined for a server in the current nomination. Further implementation details of the operations performed by system 101 are described with respect to FIGS. 1A and 1C-4.

Figure 1C:
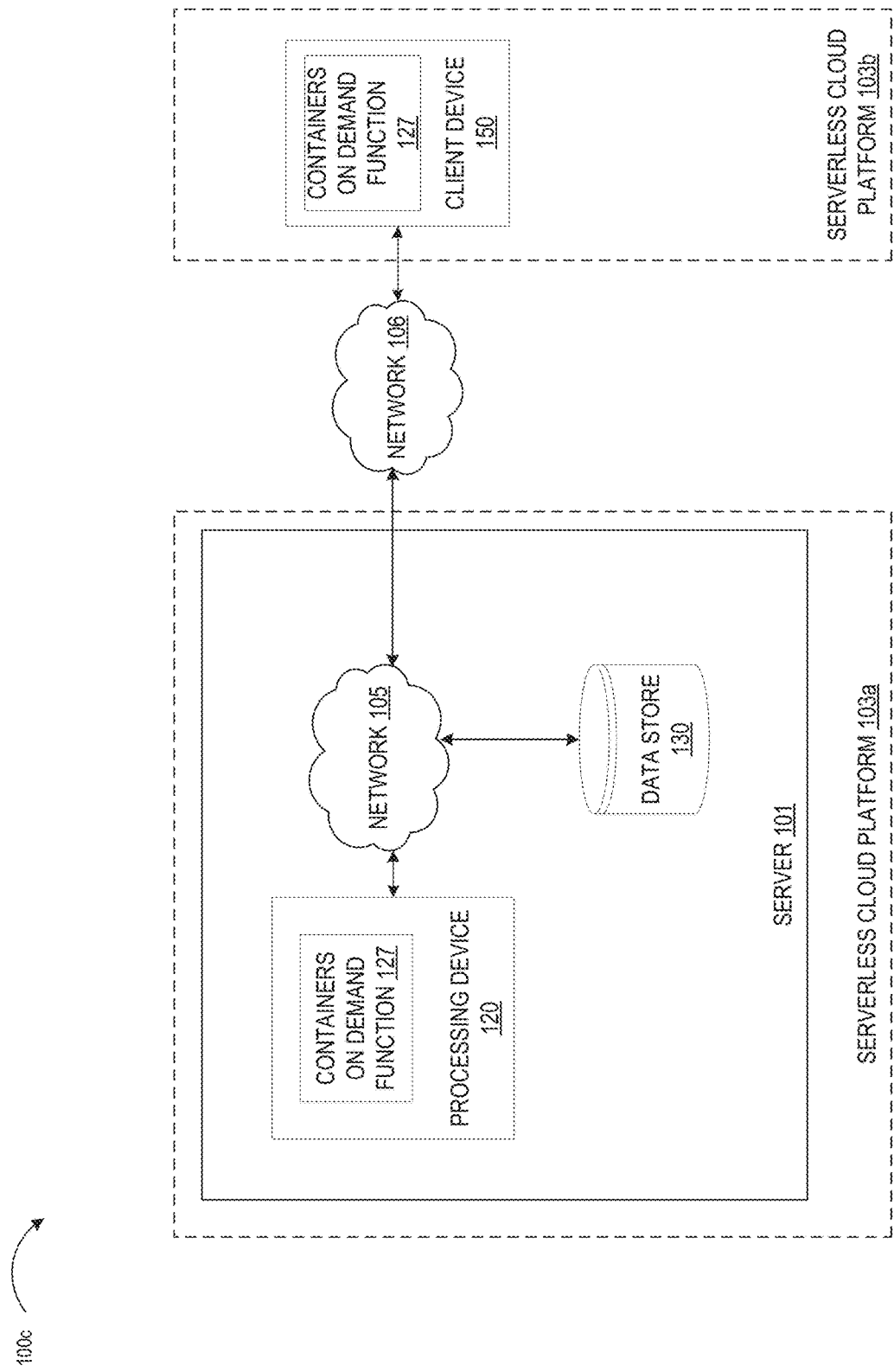
FIG. 1C is a block diagram that illustrates a third example system, in accordance with some embodiments of the present disclosure.

FIG. 1C is a block diagram that illustrates a third example system 100c, in accordance with some embodiments of the present disclosure. System 100b includes one or more cloud platforms 103a and 103b, which may include one or more components. As discussed herein, containers on demand function 127 may include logic that enables the operations and systems described herein, when executed. In one embodiment, system 100c may be described as a cloud platforms 103a and/or 103b, including means for performing the operations described herein (e.g., server 101, network 106, client device 150, etc.). In one embodiment, containers on demand function 127 resides in whole or in part on a server (e.g., server 101) of system 100c. In another embodiment, containers on demand function 127 resides in whole or in part on a client device (e.g., client device 150) of system 100c. In yet another embodiment, containers on demand function 127 resides in whole or in part on any combination of the two, or in a different system entirely.

Server 101 may include various components, which may allow containers on demand function 127 to run on a server device or client device. Each component may perform different functions, operations, actions, processes, methods, etc., for the embodiments described herein and/or may provide different services, functionalities, and/or resources for the embodiments described herein.

As illustrated in FIG. 1C, server 101 includes containers on demand function 127, a computing processing device 120, a data store 130, and a network 105. The containers on demand function 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101 and/or between a variety of cloud platforms (e.g., 103a and 103b). The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include containers on demand function 127, in addition to, or alternatively from, server 101. In various embodiments, client device 150 may act as a server by itself, in this case it can also be the barrier of the containers on demand function as defined for a server in the current nomination. Further implementation details of the operations performed by system 101 are described with respect to FIGS. 1A-B and 2-4.

Figure 2:
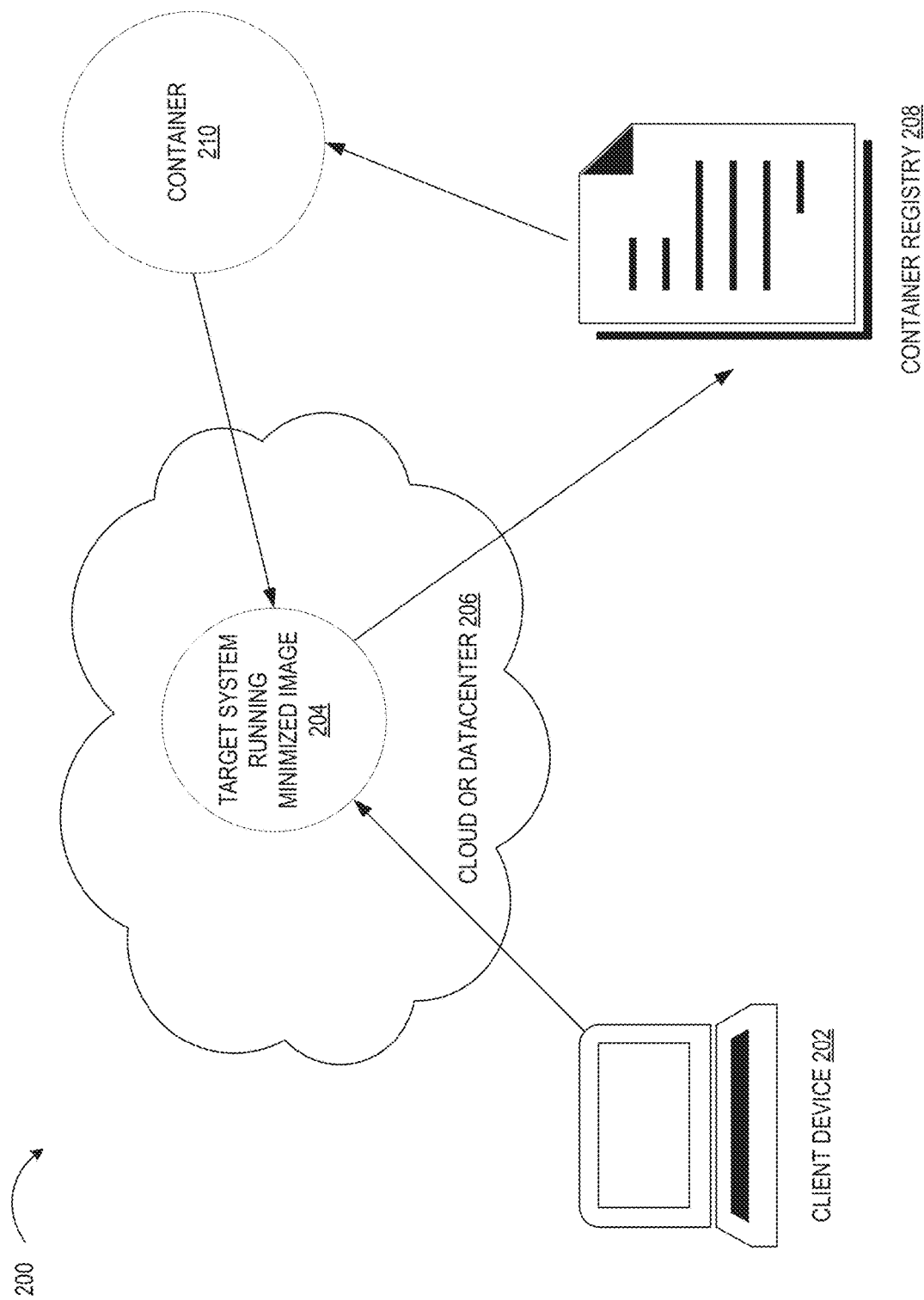
FIG. 2 is a block diagram that illustrates an example cloud environment including a target system, in accordance with some embodiments of the present disclosure.

FIG. 2 is a block diagram that illustrates an example cloud environment including a target system 200, in accordance with some embodiments of the present disclosure. In one embodiment, the protocol described herein calls for a feature referred to herein as containers on demand. The idea behind this feature is that there exists a registry items respectively corresponding to any suitable containerized tooling (e.g., Cockpit, SSH, pcp, etc.) in a registry 208.

When an event is detected or received (e.g., from client device 202), an external-to-the-target-system (e.g., 204) communication is initiated by an external tool. For example, an attempt to login on the SSH port or an attempt to login on a Cockpit port by client device 202 may be received by target system 204 of cloud or datacenter 206. In one embodiment, Systemd is the service that runs on a system by default and is responsible for the socket activated invocation on the processes to serve the accepting side of the connection. Currently the content responsible for accepting the connection is expected to already be installed on the system. The embodiments described herein provide for extending systemd to fetch a container (e.g., 210) from the registry on demand 208 and run it to serve the connection (e.g., between client device 202 and target system 204. Once the connection is closed, systemd can discard the container and clean the system.

Advantageously, to avoid long delays, some of the images may be cached on the target system 204 or on a file share close to the system 204 to reduce the cost of the download. However, the call to the registry 208 may be made to validate that the access to the target system 204 is actually permitted via this channel at that time. Such integration with registry 208 and access control check to download the container 210 at the given time to serve on a specific system (e.g., 204) adds an additional level of security preventing unauthorized access to the system during determined time intervals and via determined channels through which the systems should not be accessed. Advantageously, calling registry 208 and performing an access check is an auditable event. Using registry 208 and the access control check described herein avoids having bits already installed on the client side. This is a significant gain because one does not need to configure and harden the bits on the client side and make sure they are compliant. Having vetted containers with a specific vetted configuration raises the overall security and compliance of the deployment, while reducing the risks and management overhead related to hardening of the rarely used but installed content on each and every system.

Figure 3:
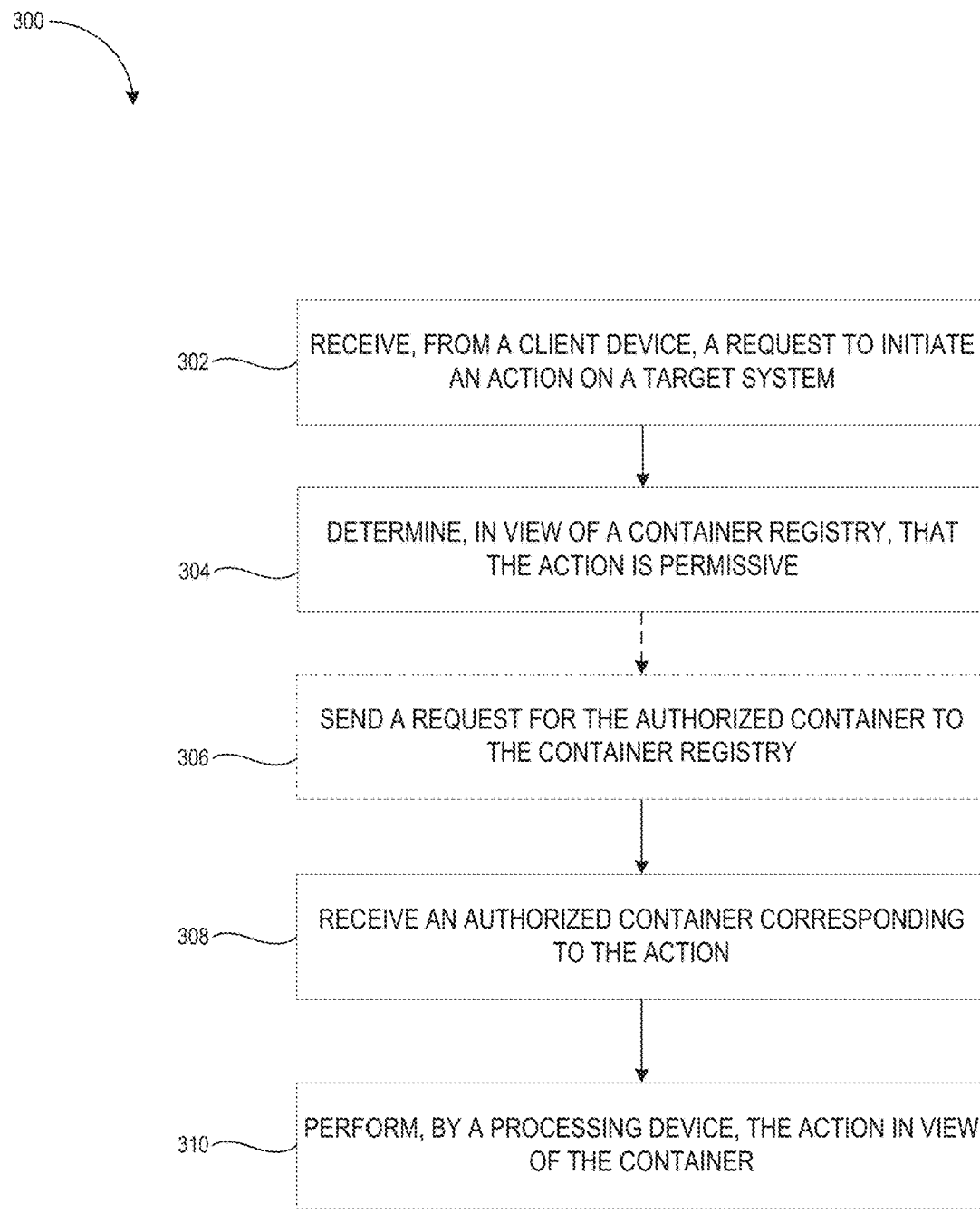
FIG. 3 is a flow diagram illustrating operations to enable containers on demand, in accordance with some embodiments of the present disclosure.

FIG. 3 is a flow diagram 300 illustrating operations to enable containers on demand, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C and FIG. 2 may perform one or more of the following operations. For example, in one embodiment, processing logic of processing device 120 performs the following operations, with respect to the individual components of FIG. 1A-C and/or FIG. 2. In another embodiment, any other suitable processing device may perform the described operations.

Referring to FIG. 3, at block 302, processing logic may receive, from a client device, a request to initiate an action on a target system. In one embodiment, the action corresponds to logging into the target system using a secure shell (SSH) protocol. In another embodiment, the action corresponds to collecting a metric of the target system using a port control protocol (PCP). In another embodiment, the action corresponds to viewing a configuration of the target system. In yet another embodiment, the action corresponds to troubleshooting the target system. In one embodiment, the target system is running a minimized image (e.g., a golden image) incapable of performing the action without modification.

In one embodiment, processing logic (e.g., of the system) may determine whether it is possible or not to perform the action. If a container to serve the requested operation is available—it is possible, if it does not have such a container—it is not possible. The system may then work with a central authority, like a registry, to make sure that the action, even if is possible, is actually permitted at the moment.

At block 304, processing logic determines, in view of a container registry, that the action is permissive. In one embodiment, to determine that the action is permissive, processing logic may determine that the action is allowed on the target system at a time of the request (e.g., based on an entry in a registry identifying the permissive activities and corresponding time periods. In another embodiment, the registry may simply contain a flag indicating that the requested activity is either currently permissive or that it is not.

At block 306, processing logic may optionally send a request for the authorized container to the container registry (e.g., in response to the determining). In another embodiment, the request is not sent. At block 308, processing logic receives an authorized container corresponding to the action (e.g., either in response to the request at block 306, or in response to the determining at block 304).

At block 310, processing logic performs (e.g., by a processing device) the action in view of (e.g., based on, by, etc.) the container. In one embodiment, performing the action includes establishing a connection from the authorized container to the client device, executing the action, removing the connection, and discarding the authorized container.

Figure 4:
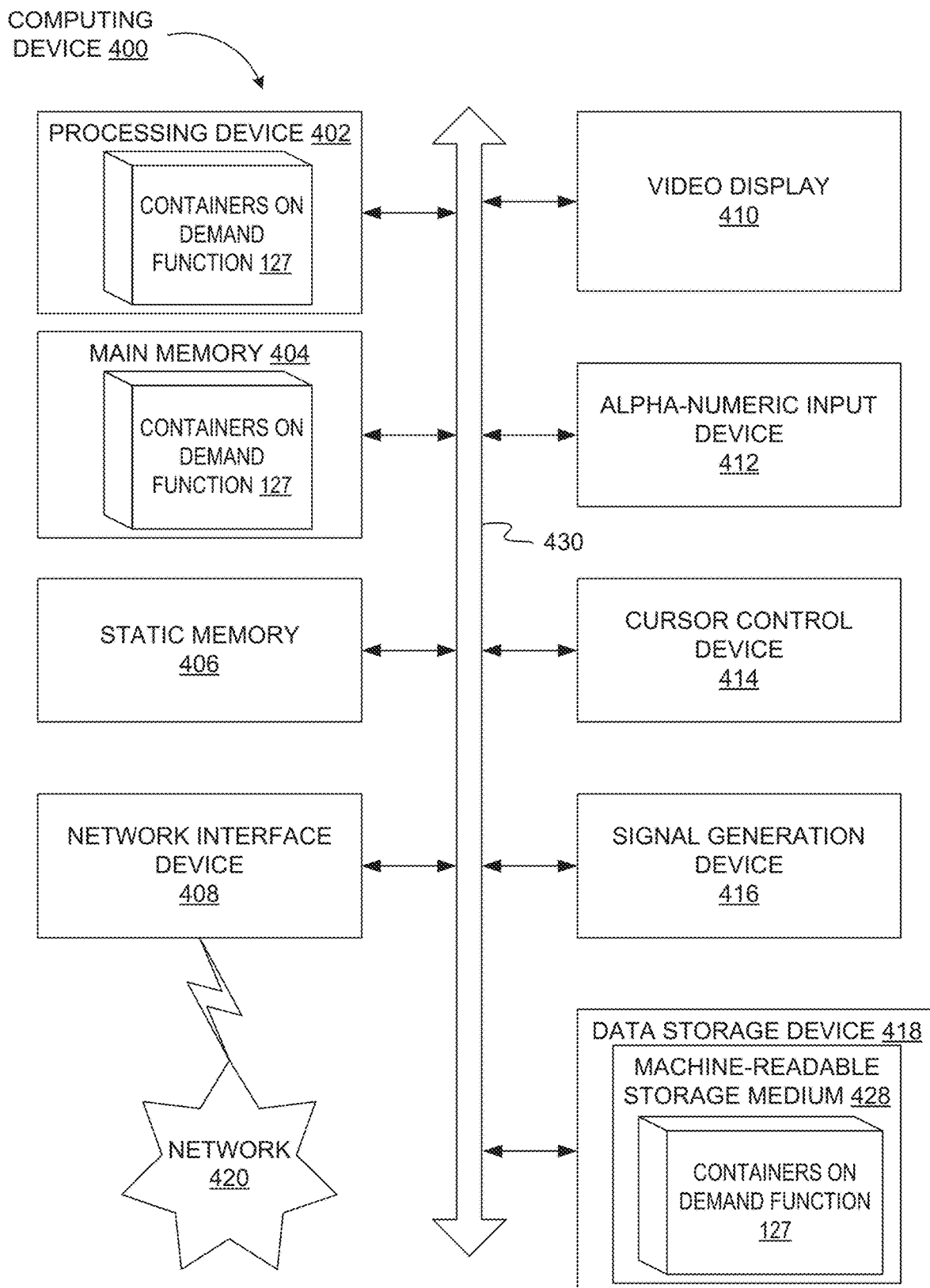
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 120 of FIG. 1A. In another embodiment, processing device 402 represents a processing device of a client device (e.g., client device 150 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing containers on demand function 426 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    determining that a triggering event has occurred within a target system, wherein the triggering event is associated with a first action performed on the target system;
    determining a second action associated with the first action, wherein the first action indicates a demand for the second action;
    generating, by a system external to the target system, a request to a container registry for a container comprising a service to perform the second action;
    determining, in view of the container registry, that the second action is authorized on the target system;
    receiving, at the target system, an authorized container corresponding to the second action, wherein the authorized container is selected from a plurality of containers in view of the second action to be performed on the target system and a functionality provided by a service of the authorized container;
    running the authorized container on the target system; and
    performing, by a processing device, the second action on the target system in view of the functionality provided by the service of the authorized container running on the target system.

2. The method of claim 1, further comprising sending a request for the authorized container to the container registry.

3. The method of claim 1, wherein determining that the action is authorized comprises determining that the action is allowed on the target system at a time of the request.

4. The method of claim 1, wherein the target system is running a minimized image incapable of performing the action without modification.

5. The method of claim 1, wherein performing the action in view of the container comprises:
    establishing a connection from the authorized container to the client device;
    executing the action;
    removing the connection; and
    discarding the authorized container.

6. The method of claim 1, wherein the action corresponds to at least one of:
    logging into the target system using a secure shell (SSH) protocol; or
    collecting a metric of the target system using a port control protocol (PCP).

7. The method of claim 1, wherein the action corresponds to at least one of:
    viewing a configuration of the target system; or
    troubleshooting the target system.

8. A system, comprising:
    a memory to store a container registry; and
    a processing device operatively coupled to the memory, the processing device to:
        determine that a triggering event has occurred within a target system, wherein the triggering event is associated with a first action performed on the target system;
        determine a second action associated with the first action, wherein the first action indicates a demand for the second action;
        generate, by a system external to the target system, a request to a container registry for a container comprising a service to perform the second action;
        determine, in view of the container registry, that the second action is authorized on the target system;
        receive, at the target system, an authorized container corresponding to the second action, wherein the authorized container is selected from a plurality of containers in view of the second action to be performed on the target system and a functionality provided by a service of the authorized container;
        run the authorized container on the target system; and
        perform the second action on the target system in view of the functionality provided by the service of the authorized container running on the target system.

9. The system of claim 8, the processing device further to send a request for the authorized container to the container registry, in response to the determining.

10. The system of claim 8, wherein to determine that the action is authorized the processing device further to determine that the action is allowed on the target system at a time of the request.

11. The system of claim 8, wherein the target system is running a minimized image incapable of performing the action without modification.

12. The system of claim 8, wherein to perform the action in view of the container the processing device further to:
   establish a connection from the authorized container to the client device;
   execute the action;
   remove the connection; and
   discard the authorized container.

13. The system of claim 8, wherein the action corresponds to at least one of:
   logging into the target system using a secure shell (SSH) protocol; or
   collecting a metric of the target system using a port control protocol (PCP).

14. The system of claim 8, wherein the action corresponds to at least one of:
   viewing a configuration of the target system; or
   troubleshooting the target system.

15. A non-transitory computer-readable storage medium including instructions that, when executed by a processing device, cause the processing device to
   determine that a triggering event has occurred within a target system, wherein the triggering event is associated with a first action performed on the target system;
   determine a second action associated with the first action, wherein the first action indicates a demand for the second action;
   generate, by a system external to the target system, a request to a container registry for a container comprising a service to perform the second action;
   determine, in view of the container registry, that the second action is authorized on the target system;
   receive, at the target system, an authorized container corresponding to the second action, wherein the authorized container is selected from a plurality of containers in view of the second action to be performed on the target system and a functionality provided by a service of the authorized container;
   run the authorized container on the target system; and
   perform, by the processing device, the second action on the target system in view of the functionality provided by the service of the authorized container running on the target system.

16. The non-transitory computer-readable storage medium of claim 15, the processing device further to send a request for the authorized container to the container registry.

17. The non-transitory computer-readable storage medium of claim 15, wherein to determine that the action is authorized the processing device further to determine that the action is allowed on the target system at a time of the request.

18. The non-transitory computer-readable storage medium of claim 15, wherein the target system is running a minimized image incapable of performing the action without modification.

19. The non-transitory computer-readable storage medium of claim 15, wherein to perform the action in view of the container the processing device further to:
   establish a connection from the authorized container to the client device;
   execute the action;
   remove the connection; and
   discard the authorized container.

20. The non-transitory computer-readable storage medium of claim 15, wherein the action corresponds to at least one of:
   logging into the target system using a secure shell (SSH) protocol;
   collecting a metric of the target system using a port control protocol (PCP);
   viewing a configuration of the target system; or
   troubleshooting the target system.

* * * * *